United States Patent
Noda

(10) Patent No.: US 11,227,154 B2
(45) Date of Patent: Jan. 18, 2022

(54) LEDGER RECOGNITION SYSTEM

(71) Applicant: Fukuoka Financial Group, Inc., Fukuoka (JP)

(72) Inventor: Takahiro Noda, Fukuoka (JP)

(73) Assignee: FUKUOKA FINANCIAL GROUP, INC., Fukuoka (JP)

( * ) Notice: Subject to any disclaimer, the term of this patent is extended or adjusted under 35 U.S.C. 154(b) by 285 days.

(21) Appl. No.: 16/463,239

(22) PCT Filed: Mar. 29, 2019

(86) PCT No.: PCT/JP2019/014036
§ 371 (c)(1),
(2) Date: May 22, 2019

(87) PCT Pub. No.: WO2019/225157
PCT Pub. Date: Nov. 28, 2019

(65) Prior Publication Data
US 2021/0110152 A1    Apr. 15, 2021

(51) Int. Cl.
*G06K 9/00*  (2006.01)
*G06F 40/284*  (2020.01)

(52) U.S. Cl.
CPC ....... *G06K 9/00469* (2013.01); *G06F 40/284* (2020.01); *G06K 9/00456* (2013.01); *G06K 2209/011* (2013.01)

(58) Field of Classification Search
None
See application file for complete search history.

(56) References Cited

U.S. PATENT DOCUMENTS

2008/0294514 A1* 11/2008 Caiman .............. G06Q 30/0269
    705/14.66
2010/0031330 A1*  2/2010 Von Ahn ................. G06F 21/36
    726/5

(Continued)

FOREIGN PATENT DOCUMENTS

JP    06-152845 A    5/1994
JP    06-162273 A    6/1994

(Continued)

*Primary Examiner* — David Perlman
(74) *Attorney, Agent, or Firm* — Lucas & Mercanti, LLP

(57) ABSTRACT

Provided is a ledger recognition system which can enhance recognition accuracy of a handwritten character filled out by a user thus capable of reducing a manual work in a correction operation. A ledger recognition system includes: a headquarter server configured to recognize handwritten characters described in a ledger by a user; a system terminal including an image scanner for reading the handwritten characters filled out in the ledger by the user; and a public telecommunication network which allows the headquarter server and the system terminal to be communicably connected with each other. The headquarter server includes a handwritten character recognition unit where the handwritten character recognition unit receives the image data of the ledger read by the image scanner from the system terminal, recognizes the handwritten characters written by the user in the image data of the received ledger in accordance with at least two types of OCR recognition programs having different algorithms, determines the handwritten characters described in the ledger with respect to a part of the handwritten characters where recognition results in accordance with the OCR recognition programs agree with each other, and sets a part of the handwritten characters where the recognition results by the OCR recognition programs do not agree with each other as an object of correction processing.

2 Claims, 6 Drawing Sheets

(56) References Cited

U.S. PATENT DOCUMENTS

2013/0121581 A1* 5/2013 Wei .................... G06K 9/18
                                                    382/182
2017/0076114 A1* 3/2017 Rai ................ G06F 21/6254
2017/0323173 A1* 11/2017 Hall ............... G06K 9/00469

FOREIGN PATENT DOCUMENTS

| JP | 06162273 A | * | 6/1994 |
| JP | 2001-022883 A | | 1/2001 |
| JP | 2003-331214 A | | 11/2003 |
| JP | 2006-190093 A | | 7/2006 |
| JP | 2006190093 A | * | 7/2006 |
| JP | 2007-011656 A | | 1/2007 |

* cited by examiner similar character data

| 1 | ア、マ | 11 | メ、ヌ | 21 | モ、キ |
|---|---|---|---|---|---|
| 2 | エ、ユ | 12 | キ、モ | 22 | ユ、キ |
| 3 | ク、ケ | 13 | ヤ、マ | 23 | チ、テ |
| 4 | コ、ユ | 14 | ラ、ヲ | 24 | チ、ヲ |
| 5 | シ、ツ | 15 | ラ、ウ | 25 | ト、メ |
| 6 | ス、ヌ | 16 | リ、ン | 26 | ヨ、ヲ |
| 7 | ソ、ン | 17 | ワ、ク | | |
| 8 | テ、ラ | 18 | ワ、ケ | | |
| 9 | ノ、イ | 19 | ン、ノ | | |
| 10 | フ、ク | 20 | サ、ク | | |

FIG. 6A

| bank name | ニホン |
|---|---|
| branch office name | ギンザ |
| subject | フツウ |
| account number | 9999999 |
| recipient user name | ⑰キタ ㋐イ |

50

M1  M1

| bank name | ニホン |
|---|---|
| branch office name | ギンザ |
| subject | フツウ |
| account number | 9999999 |
| recipient user name | ㋗キタ ㋮イ |

| bank name | ニホン |
|---|---|
| branch office name | ギンザ |
| subject | フツウ |
| account number | 0000000 |
| recipient user name | ス⑦キ イ⑦ロー |

53

M2  M2

| bank name | ニホン |
|---|---|
| branch office name | ギンザ |
| subject | フツウ |
| account number | 0000000 |
| recipient user name | ス㋡キ イ㋠ロー |

54

M2  M2

LEDGER RECOGNITION SYSTEM

CROSS REFERENCE TO RELATED APPLICATION

This Application is a 371 of PCT/JP2019/014036 filed on Mar. 29, 2019, which claims benefit of Japanese Patent Application No. 2018-100631, filed on May 25, 2018, both of which are incorporated herein by reference.

TECHNICAL FIELD

The present invention relates to a ledger recognition system, and more particularly to a ledger recognition system capable of recognizing with high accuracy handwritten characters written in a ledger in a standard size read by an image scanner by optical character recognition processing.

BACKGROUND ART

Conventionally, in a bank or the like, there has been adopted a procedure where a user fills out characters (Chinese characters, katakana (angular Japanese syllabary used primarily for loanwords), numbers, or the like) in a ledger in a standard size, and a procedure such as a transfer or the like is performed based on the ledger. Recently, in general, such a handwritten ledger is read by an image scanner, the read ledger is subjected to optical character recognition/reader (OCR) processing, and the ledger is registered in a system of a computer.

Recently, in a program which executes optical character recognition processing (hereinafter simply referred to as OCR), particularly, recognition accuracy (judgment accuracy) of printed characters is enhanced. However, recognition accuracy of handwritten characters fill-out by a user is not less than optimal and hence, for example, handwritten characters which cannot be recognized by the OCR occur at considerable probability with respect to katakana, numbers or the like. To cope with such a situation, the handwritten characters which cannot be recognized by the OCR are eventually corrected based on the determination made by a bank clerk. This correction operation imposes a burden on a teller operation in a bank or the like.

In view of the above, there has been disclosed a character recognition system and a character recognition method where character recognition or correction can be performed efficiently corresponding to the content described in a specified fill-out field in a ledger having plural types of fill-out fields (see patent literature 1).

CITATION LIST

Patent Literature

PTL 1: JP 20007-011656 A

SUMMARY OF INVENTION

Technical Problem

However, in the above-mentioned patent literature 1, basically, for efficiently performing the correction of data of a ledger read by an OCR, a specified fill-out field corresponding to the ledger is simply discriminated. Accordingly, the technique disclosed in patent literature 1 does not intend to enhance a recognition rate of handwritten characters.

Accordingly, it is an object of the present invention to provide a ledger recognition system which can enhance recognition accuracy of a handwritten character filled out by a user thus capable of reducing a manual work in a correction operation.

The present invention provides a ledger recognition system which includes:

a headquarter server configured to recognize handwritten characters described in a ledger by a user;

a system terminal including an image scanner for reading the handwritten characters filled out in the ledger by the user; and a public telecommunication network which allows the headquarter server and the system terminal to be communicably connected with each other, wherein the headquarter server includes a handwritten character recognition unit where the handwritten character recognition unit receives the image data of the ledger read by the image scanner from the system terminal, recognizes the handwritten characters written by the user in the image data of the received ledger in accordance with at least two types of OCR recognition programs having different algorithms, determines the handwritten characters described in the ledger with respect to a part of the handwritten characters where recognition results in accordance with the OCR recognition programs agree with each other, and sets a part of the handwritten characters where the recognition results by the OCR recognition programs do not agree with each other as an object of correction processing.

The handwritten character recognition unit is configured to perform number determination processing where numbers are extracted from the handwritten characters described in the ledger, and a part of the numbers which cannot be discriminated in the respective recognition results obtained in accordance with the OCR recognition programs is determined by analyzing a characteristic of the number handwritten by the user.

The handwritten character recognition unit is configured to perform first user name correction processing where a user name which corresponds to a bank name, a branch name, a subject and an account number described in the ledger and determined based on recognition results respectively obtained in accordance with the OCR recognition programs is acquired based on the bank name, the branch name, the subject and the account number, and the acquired user name and a user name determined based on recognition results respectively obtained in accordance with the OCR recognition programs are compared with each other for correcting the user name.

The handwritten character recognition unit is configured to perform second user name correction processing where Japanese reading syllabary based on Chinese character recognition of a user name described in the ledger and determined based on recognition results respectively obtained in accordance with the OCR recognition programs is extracted, and the extracted Japanese reading syllabary and the user name determined as the recognition results respectively obtained in accordance with the OCR recognition programs are compared with each other for correcting the user name.

Plural types of ledger layouts are preliminarily registered in the headquarter server, and the headquarter server is configured to specify a ledger layout based on image data of the ledger among the plural types of ledger layouts, to extract the handwritten characters written by the user from a fill-out column of the specified ledger layout in which first user information, second user information and amount-ofmoney information are filled out, and to recognize the handwritten characters in accordance with the OCR programs.

Advantageous Effects of Invention

According to the present invention, the headquarter server has at least two or more types of OCR recognition programs having different algorithms. The headquarter server recognizes handwritten characters described (filled out) by a user in a ledger (a transfer request form or the like in a financial organization such as a bank, for example) from image data of the ledger received from a system terminal in accordance with the plurality of OCR recognition programs. The headquarter server determines the handwritten characters when the recognition results of two or more types of OCR recognition programs having different algorithms agree with each other, and the handwritten characters where the recognition results do not agree with each other is an object of correction treatment. Accordingly, the headquarter server can speedily judge and determine the handwritten characters described in the ledger by the user. Further, the handwritten character which is an object of correction processing is eventually corrected by manual determination (for example, a clerk of a financial organization). In this manner, according to the present invention, the handwritten characters which the user fills out in the ledger are automatically recognized and determined in accordance with at least two or more types of OCR recognition programs having different algorithms. Accordingly, discrimination accuracy of handwritten characters can be enhanced.

The handwritten character recognition unit performs number determination processing where the handwritten character recognition unit determines the number forming a part which cannot be discriminated in the respective recognition results in accordance with at least two or more types of OCR recognition programs having different algorithms (hereinafter simply referred to as the plurality of OCR recognition programs) by extracting the number from the handwritten characters described in the ledger, and by analyzing a characteristic of the handwritten number of the user. That is, in the present invention, only the number is extracted from the handwritten characters described in the ledger, and the characteristic (for example, the number "7" being described with a large width, the number "9" having a small circle on an upper portion thereof or the like) is discriminated. Then, the handwritten number is recognized and determined by adding the above-mentioned characteristic to the number forming the part which cannot be discriminated in the respective recognition results by the plurality of OCR recognition programs. In this manner, by performing the determination by combining the characteristic of the handwritten number for each user with a recognition pattern of the handwritten number which the OCR recognition program has conventionally, the number forming a part which the plurality of OCR recognition programs cannot recognize can be automatically recognized and determined.

The handwritten character recognition unit performs first user name correction processing where the handwritten character recognition unit acquires a user name which corresponds to a bank name, a branch office name, a subject and an account number described in the ledger and determined based on the respective recognition results obtained in accordance with the plurality of OCR recognition programs based on the bank name, the branch office name, the subject and the account number (a recipient name when the ledger is a transfer request form), and the acquired user name and a user name determined based on recognition results respectively obtained in accordance with the plurality of OCR recognition programs are compared with each other for correcting the user name. That is, in a financial organization (an own bank, a business tie-up bank or the like), in general, the name of the user (katakana) which corresponds to a bank name, a branch office name, a subject, an account number of an account which the user opens is formally registered in a customer management computer or the like. Accordingly, when a bank name, a branch office name, a subject, and an account number are already determined as results of the respective recognitions of the plurality of OCR recognition programs, the user acquires the authorized user name (katakana) which corresponds to the bank name, the branch office name, the subject and the bank account from the customer management computer of the financial organization where the user opens the account. Then, the acquired user name (katakana) and the user name (katakana) which is discriminated and determined in accordance with the plurality of OCR recognition programs are compared with each other. When the acquired authorized user name (katakana) and the user name (katakana) discriminated and determined in accordance with the plurality of OCR recognition programs differ from each other, the user name is corrected to the acquired authorized user name (katakana). Accordingly, the user name (katakana) which is discriminated and determined in accordance with the plurality of OCR recognition programs can be temporarily corrected to the authorized user name and hence, reliability in determining the user name (katakana) can be enhanced.

The handwritten character recognition unit extracts Japanese reading syllabary based on Chinese character recognition of the user name (for example, the name of a requester and the name of a recipient when the ledger is a transfer request form) which is determined as the respective recognition results respectively obtained in accordance with the plurality of OCR recognition programs, and performs second user name correction processing where the extracted Japanese reading syllabary and the user name (katakana) determined as the recognition results obtained respectively in accordance with the plurality of OCR recognition programs are compared with each other for correcting the user name. That is, in a financial organization (an own bank, a business tie-up another bank or the like), in general, the user name is filled out in a ledger (transfer request form) in the form of handwritten characters both in Chinese character and katakana. Accordingly, in the case where the respective Chinese character recognitions in accordance with the plurality of OCR recognition programs are already determined, Japanese reading syllabary of the Chinese character and the user name (katakana) determined as the respective recognition results in accordance with the plurality of OCR recognition programs are compared with each other. When the user name (katakana) differs from Japanese reading syllabary of the Chinese character, the correction is made so as to use Japanese reading syllabary of the Chinese character as the user name (katakana). Accordingly, when there exists a part of the user name (katakana) described in the ledger which cannot be discriminated as the result of the respective recognition results in accordance with the plurality of OCR recognition programs or when there is an erroneously recognized part in the user name (katakana) described in the ledger, the user name can be determined based on Japanese reading syllabary of the acquired Chinese character. That is, the reliability in determining the user name (katakana) can be enhanced.

A plural type of layouts are preliminarily registered in the headquarter server. The headquarter server specifies a ledger layout based on image data of the ledger among plural types of ledger layouts, extracts user's handwritten characters from the fill-out columns of the specified ledger layout where first user information, second user information and an amount-of-money information are filled out, and recognizes the handwritten characters in accordance with the plurality of OCR recognition programs. That is, the ledger has the plural types of ledger layouts. For example, assuming that the ledger is a transfer request form, the positions of fill-out columns differ with respect to recipient information (bank name, branch office name, subject, account number, name and the like) which forms the first user information, requester information (address, name, telephone number and the like) which forms the second user information, amount-of-money information (transfer amount, transfer fee or the like) and the like for each transfer request form. Accordingly, using a character (a requester, a recipient, an amount-of-money or the like) printed on a ledger as a trigger, a ledger layout is recognized from image data of the ledger read by an image scanner, and the correspondence between this ledger layout and a ledger layout among the plurality of ledger layouts registered in the headquarter server is specified. Then, handwritten characters filled out by a user are extracted based on the specified ledger layout, and are recognized in accordance with the first OCR recognition program and the second OCR recognition program. Accordingly, the first user information, the second user information and the amount-of-money information can be discriminated with certainty.

BRIEF DESCRIPTION OF DRAWINGS

FIG. 6 is a view for describing first user name correction processing of the ledger recognition system of this embodiment.

DESCRIPTION OF EMBODIMENTS

The gist of the invention lies in a ledger recognition system which includes: a headquarter server configured to recognize handwritten characters described in a ledger by a user; a system terminal including an image scanner for reading the handwritten characters filled out in the ledger by the user; and a public telecommunication network which allows the headquarter server and the system terminal to be communicably connected with each other, wherein the headquarter server includes a handwritten character recognition unit where the handwritten character recognition unit receives the image data of the ledger read by the image scanner from the system terminal, recognizes the handwritten characters written by the user in the image data of the received ledger in accordance with at least two types of OCR recognition programs having different algorithms, determines the handwritten characters described in the ledger with respect to a part of the handwritten characters where recognition results in accordance with the OCR recognition programs agree with each other, and sets a part of the handwritten characters where the recognition results by the OCR recognition programs do not agree with each other as an object of correction processing.

Figure 1:
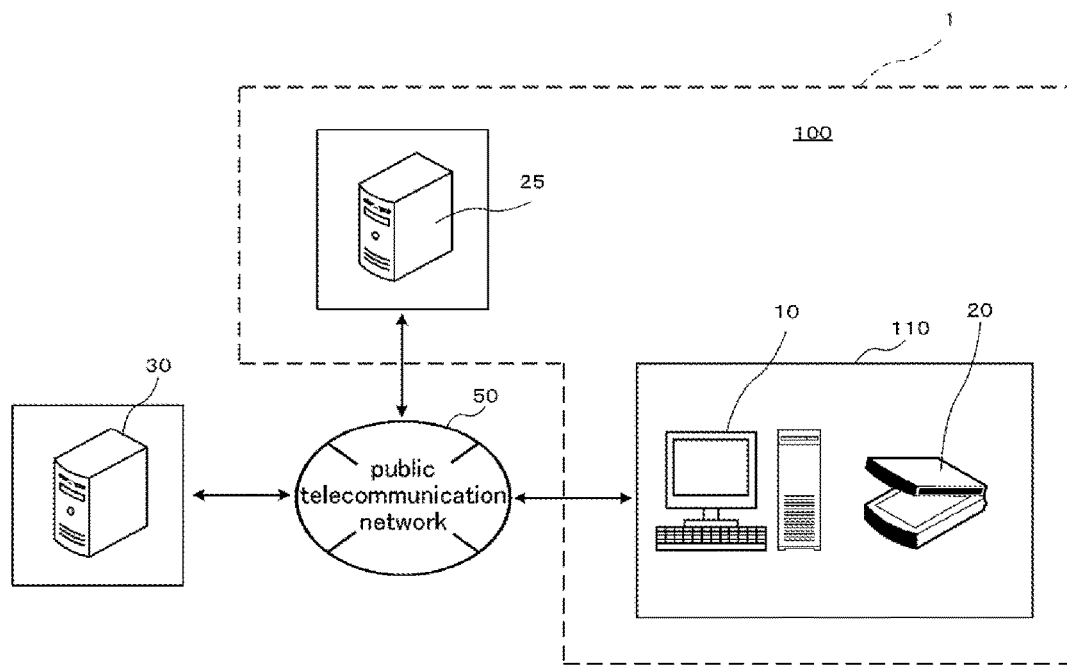
FIG. 1 is a view showing the configuration of a ledger recognition system according to this embodiment.
Figure 2:
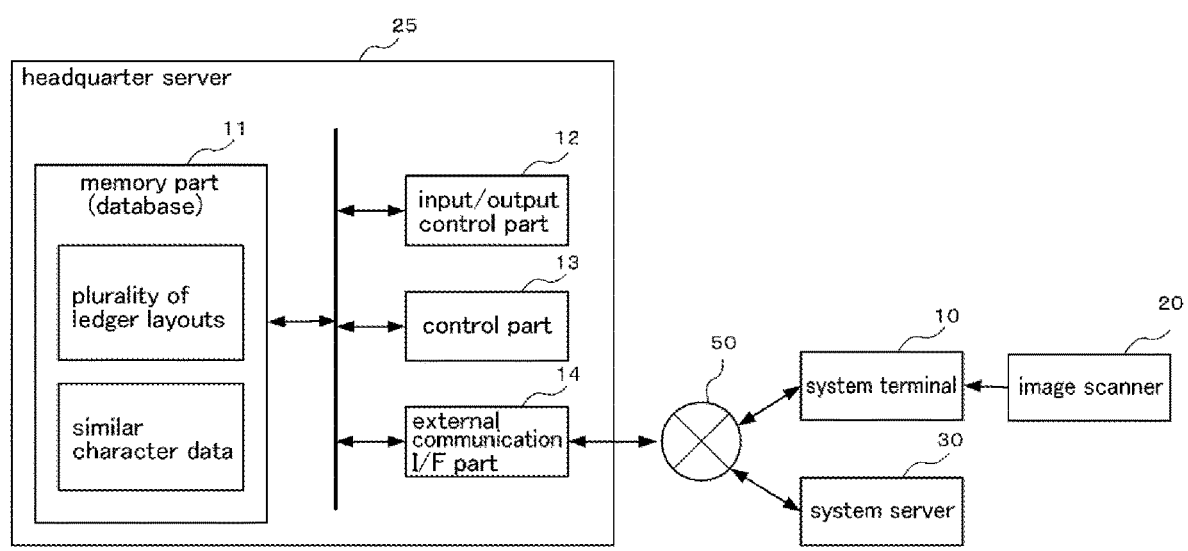
FIG. 2 is a block diagram for describing the electrical configuration of a headquarter server of the ledger recognition system according to this embodiment.
Figure 3:
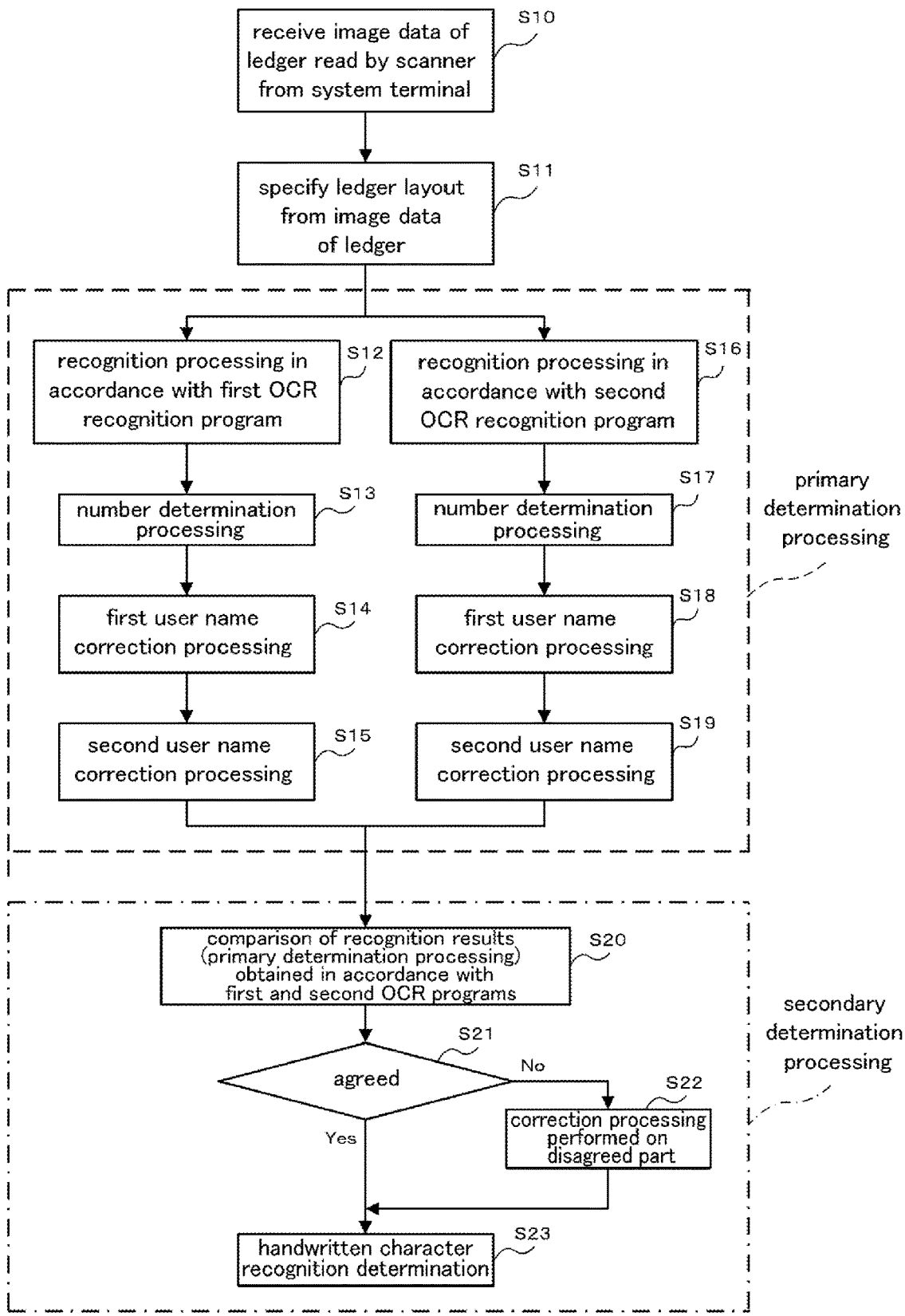
FIG. 3 is a flowchart of respective processing in the headquarter server of the ledger recognition system according to the embodiment.
Figures 4, 5:
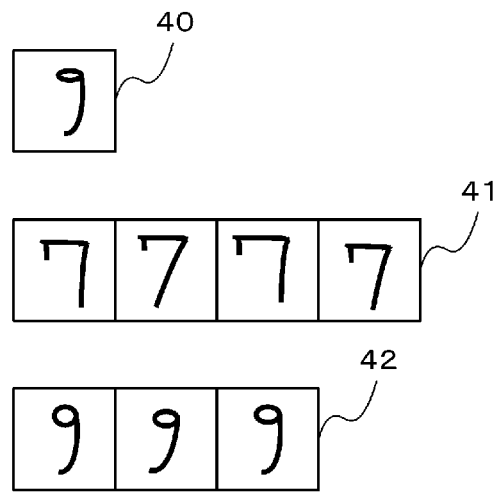
FIG. 4 is a view for describing number determination processing of the ledger recognition system according to this embodiment.
FIG. 5 is a list of similar characters of katakana in the ledger recognition system according to this embodiment.

Hereinafter, one embodiment of the present invention is described in detail with reference to the drawings. FIG. 1 is a view showing the configuration of a ledger recognition system according to this embodiment. FIG. 2 is a block diagram for describing the electrical configuration of a headquarter server of the ledger recognition system according to this embodiment. FIG. 3 is a flowchart of respective processing in the headquarter server of the ledger recognition system according to the embodiment. FIG. 4 is a view for describing the number correction of the ledger recognition system according to this embodiment. FIG. 5 is a list of similar characters of katakana in the ledger recognition system according to this embodiment. FIG. 6 is a view for describing first user name correction processing of the ledger recognition system of this embodiment. FIG. 7 is a view for describing second user name correction processing of the ledger recognition system according to this embodiment. FIG. 8 is a view for describing a ledger layout of the ledger recognition system of this embodiment.

[Configuration of Ledger Recognition System]

Hereinafter, the overall configuration of a ledger recognition system according to this embodiment is described with reference to FIG. 1. In the description made hereinafter, the case is described by assuming that a business operator who runs this system be a bank which is a financial organization, and the description is made by taking the discrimination of handwritten characters which a user fills out in a transfer request form which is a type of a ledger as an example.

As shown in FIG. 1, the ledger recognition system 1 is formed of: a headquarter server 25 installed in a headquarter or the like of a bank 100; plural types of system terminals 10 which are installed in a main office of the main bank 100 and plural types of branch offices 110 of the bank 100, and image scanners 20 which are respectively connected to the system terminals 10. The headquarter server 25 is also mutually communicably connected with the system terminals 10 installed in the main office and the plurality of branch offices 110 of the bank 100 and plural types of system servers 30 of other banks which are financial organizations having a business tie-up with the bank 100 via a public telecommunication network 50.

A well-known computer is preferably used as the system terminal 10, the headquarter server 25, and the system server 30 respectively. A stationary type desktop personal computer or the like is preferably used as the well-known computer. However, any computer which has a function of performing intercommunication via a public telecommunication network 50 can be used as the well-known computer. As the image scanner 20, any scanner which converts handwritten characters filled out in a transfer request form by a user into digital-type image data (hereinafter simply referred to as image data) and fetches the image data into the system terminal 10 can be used. That is, the image scanner 20 is not particularly limited. The public telecommunication network 50 may be a well-known internet line, a well-known mobile phone communication line, a well-known telephone line, a well-known communication satellite line or the like.

The headquarter server 25 has a handwritten character recognition unit (handwritten character recognition processing) where user's handwritten characters are recognized and determined in accordance with a first OCR recognition program and a second OCR recognition program which have different algorithms described later from image data of a transfer request form received from the system terminal 10. The system terminal 10 transmits the image data of the transfer request form in which user's handwritten characters fetched from the image scanner 20 connected to the system terminal 10 is described to the headquarter server 25.

The headquarter server 25 has a function of a customer management computer which manages customer data (a bank name, a branch office name, a subject, an account number, a user name and the like) of a user who has an account in the bank 100. With respect to this function as the customer management computer, a customer management server (not shown in the drawing) having a customer management function may be additionally provided to the main office or the like. The plurality of system servers 30 are customer management computers which manage customer data (bank name, branch office name, subject, account number, user name and the like) of users which have accounts in other banks having a business tie-up with the bank 100.

In the above-mentioned configuration, in this embodiment, the headquarter server 25 installed in the headquarter of the bank 100 which manages this system receives image data of a transfer request form read in the system terminal 10 by the image scanner 20 from the system terminal 10. A first OCR recognition program and a second OCR recognition program which have different algorithms are preliminarily stored in the headquarter server 25. User's handwritten characters described in the image data of the received transfer request form are recognized in accordance with two types of programs respectively. The number of types of OCR recognition programs having different algorithms is not limited to two and may be three or more.

In the ledger recognition system 1 according to this embodiment, handwritten characters described in a ledger are determined with respect to a part of the handwritten characters where recognition results of the handwritten characters recognized respectively in accordance with the above-mentioned first OCR recognition program and the second OCR recognition program agree with each other, and correction processing is performed manually (for example, visual observation by a bank clerk) with respect to a part of the handwritten characters where the recognition results do not agree with each other.

In this manner, by recognizing user's handwritten characters described in image data of a transfer request form in accordance with the first OCR recognition program and the second OCR recognition program having different algorithms, user's handwritten characters described on a ledger are speedily recognized and determined.

Further, in this embodiment, the ledger recognition system 1 performs various correction processing (number determination processing, first user name correction processing, and second user name correction processing described later). In such operation, the recognition of handwritten characters which form a non-discriminated part or an erroneously recognized part is corrected based on the recognition results of handwritten characters in accordance with the first OCR recognition program and the second OCR recognition program respectively. By performing various correction processing in this manner, accuracy in automatically recognizing and determining handwritten characters filled out by a user can be enhanced and hence, it is possible to provide the ledger recognition system 1 where manual working in a correction operation can be reduced.

[Configuration of Headquarter Server 25]

Hereinafter, the electrical configuration of the headquarter server 25 in the ledger recognition system 1 according to this embodiment is described. The headquarter server 25 is formed of a memory part 11, an input/output control part 12, a control part 13, an external communication interface (I/F) control part 14 and the like.

The memory part 11 is formed of a large capacity memory device such as a hard disk drive (HDD) or a flash memory. In this embodiment, discrimination results of user's handwritten characters described in image data of a transfer request form read by the image scanner 20 and image data of a transfer request form read in accordance with the first OCR recognition program and the second OCR recognition program described later are stored in a predetermined region of the memory part 11. In this embodiment, plural types of ledger layouts (see FIG. 8) and similar character data (see FIG. 5) and the like described later are preliminarily stored in a predetermined region of the memory part 11.

The input/output control part 12 controls inputting and outputting of various data between the input/output control part 12 and a liquid crystal display device not shown in the drawing which is connected to the headquarter server 25 and an external input/output device such as a keyboard/mouse.

The control part 13 is formed of a central processing unit (CPR), a read only memory (ROM), a random access memory (RAM), a flash memory and the like not shown in the drawing. The CPU of the control part 13 performs handwritten character recognition processing (handwritten character recognition unit), number determination processing, first user name correction processing, second user name correction processing and the like by executing various programs preliminarily stored in the ROM or the memory part 11.

The external communication I/F control part 14 is connected to the external public telecommunication network 50, and controls communication between the headquarter server 25 and the plurality of system terminals 10 and the plurality of system servers 30 in the ledger recognition system 1 based on instructions from the control part 13. The external communication I/F control part 14 controls the reception of image data of a transfer request form from the system terminal 10 read by the image scanner 20 and the transmission/reception of customer data (bank name, branch office name, subject, account number, user name and the like) to and from the system server 30 which is a customer management computer of another bank based on an instruction from the control part 13. Customer data received in such an operation is stored in the memory part 11 in a linked manner with plural types of users.

[Number Determination Processing]

Hereinafter, number determination processing in the ledger recognition system 1 according to this embodiment is described with reference to FIG. 4. The number determination processing is processing performed in handwritten character recognition processing described later. That is, the number determination processing is processing where the number which is a part not discriminated in recognition results of handwritten characters described in image data of a transfer request form obtained in accordance with a first OCR recognition program and in accordance with a second OCR recognition program is determined.

As shown in FIG. 4, assume that the number which is a part discriminated neither in accordance with the first OCR recognition program nor in accordance with the second OCR recognition program is a handwritten number 40 which is recognized neither as "7" nor "9". Then, only the numbers recognized as "7" and "9" are extracted from the handwritten characters described in the image data of the transfer request form. The number recognized as "7" is indicated as a handwritten number 41, and the number recognized as "9" is indicated as a handwritten number 42.

In the analysis of the extracted user's handwritten numbers 41 and 42, the handwritten number 41 recognized as the number "7" has a characteristic that the handwritten number 41 is described with a wide width. On the other hand, the handwritten number 42 recognized as the "9" has a characteristic that the handwritten number 42 has a small circle at an upper portion of the handwritten number 42. Accordingly, the handwritten number 40 which cannot be not discriminated has a characteristic that the handwritten number 40 has not a large width and a circle at the upper portion of the handwritten number 40 is small and hence, such a handwritten number 40 can be recognized and determined as the number "9".

In this manner, by performing number determination processing where a characteristic of a handwritten number is determined for each user in addition to a handwritten number recognition pattern which the first OCR recognition program and the second OCR recognition program respectively have conventionally, the number which is discriminated neither in accordance with the first OCR recognition program nor in accordance with the second OCR recognition program can be also automatically recognized and determined.

The above-mentioned characteristic of the user's handwritten number is only an example. For example, by detecting various characteristics of users handwritten number such as a characteristic that a handwritten number recognized as the number "8" has a large circle at a lower portion of the handwritten number or a characteristic that a handwritten number recognized as the number "1" has a large angle inclined rightward, the number which was discriminated neither in accordance with the first OCR recognition program nor in accordance with the second OCR recognition program can be recognized. On the other hand, when the number of samples of the user's handwritten number is small so that a characteristic cannot be found in the user's handwritten number, as a matter of course, such number is determined as the number which cannot be discriminated.

[First User Name Correction Processing]

Hereinafter, first user name correction processing in the ledger recognition system 1 according to this embodiment is described with reference to FIG. 6. This processing is the processing where the ledger recognition system 1 acquires an user name (recipient name) which corresponds to a bank name, a branch office name, a subject, an account number described in image data of a transfer request form determined as discrimination results respectively obtained in accordance with a first OCR recognition program and a second OCR recognition program based on the bank name, the branch office name, the subject, the account number in handwritten character recognition processing described later, and corrects a user name handwritten in katakana which is determined as recognition results respectively obtained in accordance with plural types of OCR recognition programs by comparing the acquired user name with the user name handwritten in katakana which is determined as recognition results respectively obtained in accordance with the plurality of OCR recognition programs with each other.

In a ledger such as a transfer request form, a column is provided where a name of a recipient (user name), and a bank name, a branch office name, a subject, and an account number of an account which the recipient has are filled out by handwriting. In a bank where the recipient has the account, an authorized user name (katakana) of the recipient is registered in the customer management computer (the headquarter server 25 in the own bank, the system server 30 in another bank) in a linked manner with the bank name, the branch office name, the subject, and the account number. In the first user name correction processing of this embodiment, by focusing on such a point, when the bank name, the branch office name, the subject, and the account number described in the image data of the transfer request form are already determined as the respective recognition results obtained in accordance with the first OCR recognition program and the second OCR recognition program, an inquiry is made to the customer management computer with respect to the bank name, the branch office name, the subject, and the account number so as to acquire the user name (katakana) of the authorized recipient, and the correction of the user name already determined as the respective recognition results obtained in accordance with the first OCR recognition program and the second OCR recognition program is performed.

As shown in FIG. 6A, assume that, in accordance with the first OCR recognition program and in accordance with the second OCR recognition program, the bank name "ニホン", the branch office name "ギンザ", the subject "フツウ", and the account number "9999999" of the account which the recipient opens are already determined. Then, an inquiry of the authorized user name of the recipient is made to the headquarter server 25 (customer management computer) when the recipient opens the account in the own bank and to the system server 30 (customer management computer) when the recipient opens the account in another bank.

As a result, the bank name, the branch office name, the subject, the account number, and the authorized user name of the recipient shown in a table 51 are acquired. At this stage of processing, the user name of the recipient which is recognized and determined in accordance with the first OCR recognition program or in accordance with the second OCR recognition program together with the bank name, the branch office name, the subject, the account number is "リキタイ" as described in a table 50. On the other hand, the user name of the recipient is "ツキタイ" in the table 51. In general, in the recognition of katakana by the OCR recognition program, the large number of similar characters exist and hence, a recognition rate is low. One example of similar characters of katakana is described as similar character data in FIG. 5. 26 kinds of similar characters are shown in FIG. 5. Similar character data shown in FIG. 5 is data preliminarily registered in the memory part 11 of the headquarter server 25, and the data is looked up for judging similar characters of katakana by the control part 13 of the headquarter server 25 when necessary.

That is, as can be explicitly understood by comparing the user name "ツキタイ" of the recipient in the acquired table 51 with the user name "リキタイ" of the recipient shown in the table 50, katakana "リ" and "ツ" which are respectively surrounded by M1 (17 in FIG. 5) in the drawing are similar characters in katakana, and katakana "ア" and "マ" (1 in FIG. 5) respectively surrounded by M1 are similar characters in katakana. Accordingly, the user name of the recipient is erroneously recognized and determined in accordance with the first OCR recognition program or in accordance with the second OCR recognition program. However, as shown in the table 51, it is confirmed that the user name of the authorized recipient is "アキタマイ". Accordingly, by correcting and changing the erroneously recognized user name of the recipient to the user name of the recipient shown in the table 51 (portions surrounded by the circle M1 in FIG. 1), the erroneous recognition by the OCR recognition program is eliminated and the user name of the authorized recipient can be determined.

In the same manner, as shown in FIG. 6B, assume that a bank name "ニホン", a branch office name "ギンザ", a subject "フツウ", and an account number "0000000" of an account which a recipient has are already determined in a first OCR recognition program and a second OCR recognition program. Then, an inquiry of an authorized user name of the recipient is made to the headquarter server 25 (customer management computer) when the recipient already opens the account in the own bank and to the system server 30 (customer management computer) in the case where the recipient already opens the account in another bank.

As a result, the bank name, the branch office name, the subject, the account number, and the authorized user name of the recipient shown in a table 54 are acquired. At this stage of processing, the user name of the recipient which is recognized in accordance with the first OCR recognition program or in accordance with the second OCR recognition program of this embodiment together with the bank name, the branch office name, the subject, and the account number is "スフキィフロー" in the table 53. On the other hand, the user name of the recipient is "スズキイチロー" in the table 54. Accordingly, it is understood that parts of "?" (or blank parts) surrounded by a circle M2 in the drawing which are parts of the user name of the recipient discriminated neither in accordance with the first OCR recognition program nor in accordance with the second OCR recognition program are "ス" and "チ" surrounded by the circle M2 in the drawing and hence, it is possible to determine the user name of the authorized recipient as "スズキイチロー".

In this manner, when the recognition result of the user name (katakana) obtained in accordance with the first OCR recognition program or in accordance with the second OCR recognition program is determined based on the erroneous recognition or when the recognition result is determined without discriminating the user name (katakana), by correcting such user name (katakana) of the recipient to the user name of the authorized recipient, it is possible to accurately determine the user name of the recipient which the user fills out in a transfer request form in katakana by handwriting.

[Second User Name Correction Processing]

Hereinafter, second user name correction processing in the ledger recognition system 1 according to this embodiment is described with reference to FIG. 7. This processing is the processing where, in handwritten character recognition processing described later, the ledger recognition system 1 extracts Japanese reading syllabary based on Chinese character recognition of user names (a requester name and a recipient name) described in image data of a transfer request form determined as respective discrimination results obtained in accordance with a first OCR recognition program and a second OCR recognition program, and corrects the user name by comparing the extracted Japanese reading syllabary with the user name in katakana determined as the respective recognition results obtained in accordance with the first OCR recognition program and the second OCR recognition program.

Figure 7A:
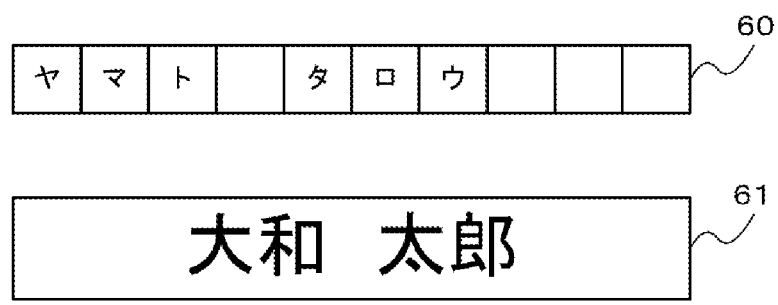
FIG. 7 is a view for describing second user name correction processing of the ledger recognition system according to this embodiment.

As shown in FIG. 7A, when katakana 60 which conforms with Japanese reading syllabary "ヤマトタロウ" of "大和太郎" which is a Chinese character name 61 is determined as respective recognition results obtained in accordance with the first OCR recognition program and the second OCR recognition program, no additional processing is performed so that the correction of the user name in katakana is not performed.

Figure 7B:
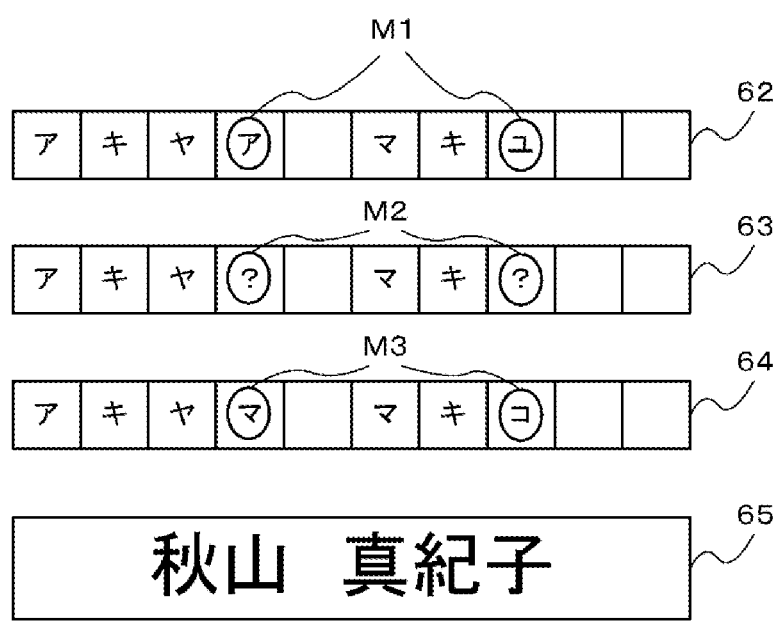

As shown in FIG. 7B, with respect to Japanese reading syllabary "アキヤママキコ" of "秋山真紀子" which is a Chinese character name 65, assume that "アキヤママキコ" is determined in a katakana 62 and "アキヤ?マキ?" is determined in a katakana 63 as the respective recognition results obtained in accordance with the first OCR recognition program and the second OCR recognition program.

With respect to the katakana 62, it is considered that the first OCR recognition program or the second OCR recognition program erroneously recognizes katakana "ア" and "マ" surrounded by a circle M1 in the drawing (1 in FIG. 5) and katakana "ユ" and "コ" surrounded by a circle M1 in the drawing (4 in FIG. 5) as similar characters in katakana. Accordingly, in conformity with Japanese reading syllabary "アキヤママキコ" of "秋山真紀子" indicated in a katakana 64, the user name is changed and corrected to the katakana 64 (to be more specific, parts "ア" と "ユ" surrounded by the circle M1 in the drawing being corrected to "マ" and "コ") and the katakana 64 is determined.

The katakana 63 includes "?" surrounded by a circle M2 in the drawing which are parts of the user name of the recipient discriminated neither in accordance with the first OCR recognition program nor in accordance with the second OCR recognition program. In this case, in conformity with Japanese reading syllabary "アキヤママキコ" of "秋山真紀子" indicated in the katakana 64, the user name is changed and corrected to the katakana 64 (to be more specific, the parts "?" surrounded by the circle M2 in the drawing being corrected to "マ" and "コ"), and the katakana 64 is determined.

According to this second user name correction processing, even when the user name of the katakana determined as the recognition result obtained in accordance with the first OCR recognition program or the second OCR recognition program cannot be discriminated or even when the user name in katakana is erroneously recognized, the user name can be determined based on Japanese reading syllabary of the Chinese character. That is, reliability in determining the correct user name (katakana) can be enhanced.

[Handwritten Character Recognition Processing]

Hereinafter, handwritten character recognition processing is described with reference to FIG. 3 where the ledger recognition system 1 according to this embodiment recognizes handwritten characters which a user fills out in a transfer request form which forms a ledger. This handwritten character recognition processing is processing performed by the control part 13 of the above-mentioned headquarter server 25. The handwritten character recognition processing functions as a handwritten character recognition unit in this embodiment.

As shown in FIG. 3, the control part 13 of the headquarter server 25 which performs handwritten character recognition processing (hereinafter, simply referred to as the control part 13) receives image data of a transfer request form which is a type of a ledger read by the image scanner 20 connected to the system terminal 10 (hereinafter, simply referred to as image data) from the system terminal 10, and stores the image data in a predetermined region of the memory part 11 (step S10).

The control part 13 specifies a ledger layout for recognizing handwritten characters based on the received image data (step S11). Plural types of ledger layouts are preliminarily registered in the headquarter server 25 of this embodiment. When the received image data differs from a usually used ledger layout, the control part 13 looks up the plurality of ledger layouts registered in the memory part 11 of the headquarter server 25. Then, the control part 13 specifies the ledger layout from the plurality of ledger layouts using printing of the image data as a trigger, and extracts handwritten characters described as first user information, second user information, amount-of-money information and the like based on the specified ledger layout.

Figure 8A:
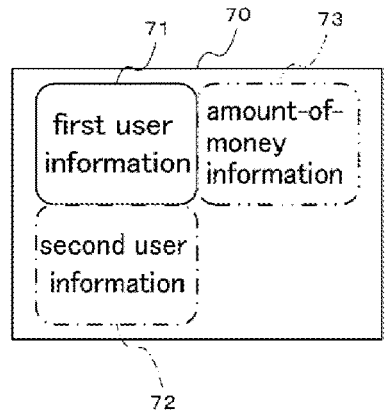
FIG. 8 is a view for describing a ledger layout of the ledger recognition system of the embodiment.
Figure 8B:
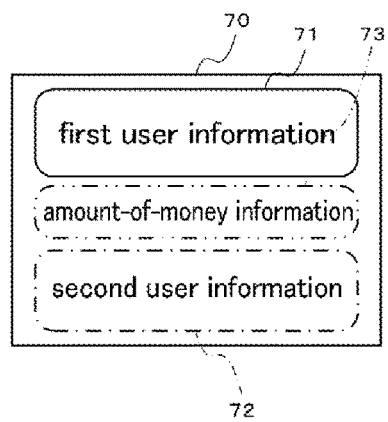
Figure 8C:
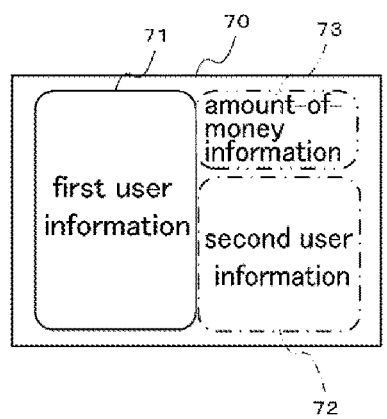

That is, as shown in FIG. 8A to FIG. 8C, with respect to a transfer request form 70 which forms a ledger, plural types of (in the drawing, three types of) ledger layouts exist. That is, the transfer request form includes three roughly divided fill-out columns consisting of recipient information (a bank name, a branch office name, a subject, an account number, a user name (Chinese character, katakana) and the like) which forms first user information 71, requester information (an address, a user name (Chinese character, katakana), a telephone number and the like) which forms second user information 72, and amount-of-money information 73 (transfer amount, transfer fee and the like). With respect to the arrangement of these three fill-out columns, the ledger layouts in plural types of patterns (three patterns in the drawing) are preliminarily registered in the memory part 11 of the headquarter server 25. Accordingly, the control part 13 recognizes the ledger layout using characters (the requester, the recipient, the amount of money and the like) printed on the transfer request form 70 which is received image data as a trigger, and specifies which ledger layout among the plurality of ledger layouts registered in the memory part 11 of the headquarter server 25 corresponds to this ledger layout. Then, based on the specified ledger layout, the control part 13 extracts handwritten characters which the user fills out, and recognizes the handwritten characters in accordance with a first OCR recognition program and in accordance with a second OCR recognition program. Accordingly, the control part 13 can recognize the first user information 71, the second user information 72, and the amount-of-money information 73 with certainty.

The control part 13 recognizes the handwritten characters described in ledger data received in accordance with the first OCR recognition program (step S12). A recognition result of handwritten characters of the image data received in accordance with the first OCR recognition program in step S11 is stored in a predetermined region of the memory part 11.

When there exists a number which is a part not discriminated in accordance with the first OCR recognition program, the control part 13 performs number determination processing for correcting the number which is the non-discriminated part (step S13). As described previously, this number determination processing is processing where the number which is the part not discriminated in accordance with the first OCR recognition program is determined based on a characteristic of an extracted user's handwritten number. The control part 13 reflects the result of the number determination processing on the recognition result obtained in accordance with the first OCR recognition program.

The control part 13 performs first user name correction processing (step S14). As described previously, this processing is the processing where the control part 13 acquires a user name (recipient name) which corresponds to a bank name, a branch office name, a subject, an account number described in image data of a transfer request form identified as the discrimination result of the first OCR recognition program, and corrects the user name by comparing the acquired user name and the user name determined as the recognition result obtained in accordance with the first OCR recognition program. The control part 13 reflects the result of the first user name correction processing on the recognition result obtained in accordance with the first OCR recognition program.

The control part 13 performs the second user name correction processing (step S15). As described previously, this processing is the processing where the control part 13 acquires Chinese characters and katakana of the user name described in the received image data, and corrects the user name in katakana based on Japanese reading syllabary based on Chinese character recognition when the control part 13 erroneously recognizes the recognition result of the user name in katakana obtained in accordance with the first OCR recognition program or the control part 13 cannot discriminate the user name in katakana. The control part 13 reflects the result of the first user name correction processing on the recognition result obtained in accordance with the first OCR recognition program.

As described previously, in the above-mentioned steps S12 to step S15, the control part 13 performs the recognition of image data in accordance with the first OCR recognition program, reflects the results obtained by performing various correction processing (number determination processing, first user name correction processing, and second user name correction processing) on the recognition result, and stores the recognition result in a predetermined region of the memory part 11 as the result of primary determination processing performed in accordance with the first OCR recognition program.

The control part 13 recognizes handwritten characters described in ledger data received in accordance with the second OCR recognition program (step S16). In step S16, the recognition result of the handwritten characters of image data received in accordance with the second OCR recognition program is stored in a predetermined region of the memory part 11 in step S16.

When there exists a number which is not discriminated in accordance with the second OCR recognition program, the control part 13 performs number determination processing for correcting the number which is not discriminated (step S17). As described previously, this number determination processing is processing where the number which is not discriminated in accordance with the second OCR recognition program is determined based on a characteristic of the extracted user's handwritten number. The control part 13 reflects the result of the number determination processing on the recognition result obtained in accordance with the second OCR recognition program.

The control part 13 performs first user name correction processing (step S18). As described previously, this processing is the processing where the control part 13 acquires a user name (recipient name) which corresponds to a bank name, a branch office name, a subject, an account number described in image data of a transfer request form determined as a discrimination result obtained in accordance with the second OCR recognition program from the bank name, the branch office name, the subject, the account number, and corrects the user name by comparing the acquired user name with the user name determined as the recognition result obtained in accordance with the first OCR recognition program. The control part 13 reflects the result of the first user name correction processing on the recognition result obtained in accordance with the second OCR recognition program.

The control part 13 performs second user name correction processing (step S19). As described previously, this processing is processing where Chinese characters and katakana of a user name described in received image data are extracted, and the user name is corrected by Japanese reading syllabary based on Chinese character recognition when the recognition result of the user name in katakana in accordance with the second OCR recognition program is erroneously recognized or the user name cannot be discriminated. The control part 13 reflects the result of the second user name correction processing on the recognition result obtained in accordance with the second OCR recognition program.

As described previously, in the above-mentioned steps S16 to step S19, the control part 13 performs the recognition of image data in accordance with the second OCR recognition program, reflects the results obtained by performing various correction processing (number determination processing, first user name correction processing, and second user name correction processing) on the recognition result, and stores the recognition result in a predetermined region of the memory part 11 as the result of primary determination processing performed in accordance with the second OCR recognition program.

The control part 13 compares the result of primary determination processing in accordance with the first OCR recognition program and the result of the primary determination processing in accordance with the second OCR recognition program with each other (step S20). The control part 13 judges whether or not the result of the primary determination processing in accordance with the first OCR recognition program and the result of the primary determination processing in accordance with the second OCR recognition program agree with each other (step S21). When it is judged that the result of the primary determination processing in accordance with the first OCR recognition program and the result of the primary determination processing in accordance with the second OCR recognition program agree with each other (step S21: Yes), the control part 13 advances processing to step S23. On the other hand, when it is judged that the result of the primary determination processing in accordance with the first OCR recognition program and the result of the primary determination processing in accordance with the second OCR recognition program do not agree with each other (step S21: No), the control part 13 performs correction processing for correcting a disagreed part of the determination result in step S22. In this correction processing, handwritten characters which are the disagreed parts of the recognition result are explicitly displayed on a display unit (a liquid crystal display device or the like not shown in the drawing) of the headquarter server 25 (displayed in the form of "?" surrounded by a circle M2 in FIG. 6B or in the form of a blank), for example. A bank clerk of the bank 100 visually recognizes image data of a transfer request form, and determines handwritten characters which are the disagreed parts detected in the recognition result. When this processing is finished, the control part 13 advances processing to step S23.

The control part 13 performs handwritten character recognition determination processing for determining recognition of the handwritten characters described in the image data (step S23). When this processing is finished, the control part 13 finishes the handwritten character recognition processing.

In the above-mentioned processing in step S20 to step S23, the control part 13 compares the recognition results of respective image data obtained in accordance with the first OCR recognition program and the second OCR recognition program respectively, and stores a comparison result as the result of secondary determination processing in accordance with the first OCR recognition program and the second OCR recognition program in the predetermined region of the memory part 11.

As has been described heretofore, in the handwritten character recognition processing according to this embodiment, image data of a transfer request form read by the image scanner 20 is transmitted to the headquarter server 25 from the system terminal 10. The headquarter server 25 recognizes user's handwritten characters described in image data received respectively in accordance with two types of OCR recognition programs (first OCR recognition program and the second OCR recognition program) having different algorithms, performs various corrections (number determination processing, first user name correction processing, and second user name correction processing) on the recognition results respectively, and adopts the corrected recognition results as the results of the primary determination processing in accordance with the first OCR recognition program and the second OCR recognition program. Then, the headquarter server 25 detects the agreement or the disagreement between the results of the primary determination processing in accordance with the first OCR recognition program and the second OCR recognition program. When a disagreed part exists, correction processing is performed manually (for example, visual observation by a bank clerk). Based on the result of secondary determination processing of the recognition results decided in this manner, the recognition result of user's handwritten characters described in the transfer request form is determined, and a transfer operation in a financial organization such as a bank is performed.

Although the embodiment according to the present invention has been described heretofore, the specific configuration of the present invention is not limited to the above-mentioned embodiment, and modifications of the embodiment in design which do not depart from the gist of the present invention are also included in the present invention.

Reference Signs List
 1: ledger recognition system
 10: system terminal
 20: image scanner
 25: headquarter server
 30: system server
 100: bank

The invention claimed is:
1. A ledger recognition system comprising:
 a headquarter server configured to recognize handwritten characters described in a ledger by a user;
 a system terminal including an image scanner for reading the handwritten characters filled out in the ledger by the user; and
 a public telecommunication network which allows the headquarter server and the system terminal to be communicably connected with each other, wherein
 the headquarter server includes a handwritten character recognition unit where the handwritten character recognition unit receives the image data of the ledger read by the image scanner from the system terminal, recognizes the handwritten characters written by the user in the image data of the received ledger in accordance with at least two types of OCR recognition programs having different algorithms, determines the handwrit- ten characters described in the ledger with respect to a part of the handwritten characters where recognition results in accordance with the OCR recognition programs agree with each other, and sets a part of the handwritten characters where the recognition results by the OCR recognition programs do not agree with each other as an object of correction processing, and the handwritten character recognition unit is configured to perform:

number determination processing where numbers are extracted from the handwritten characters described in the ledger, and a part of the numbers which cannot be identified in the respective recognition results obtained in accordance with the OCR recognition programs is determined by analyzing a characteristic of the number handwritten by the user;

first user name correction processing where a user name, which corresponds to a bank name, a branch name, a subject and an account number described in the ledger and determined as recognition results respectively obtained in accordance with the OCR recognition programs, is acquired based on the bank name, the branch name, the subject and the account number, and the acquired user name and a user name included in the image data determined as recognition results respectively obtained in accordance with the OCR recognition programs are compared with each other for correcting the user name included in the image data determined as recognition results respectively obtained in accordance with the OCR recognition programs; and second user name correction processing where the handwritten character recognition unit extracts Japanese reading syllabary in katakana based on Chinese character recognition of the user name described in the ledger and determined as recognition results respectively obtained in accordance with the OCR recognition programs, and corrects the user name by referring to similar character data in katakana stored in the headquarter server and comparing the extracted Japanese reading syllabary and the user name in katakana determined as the recognition results respectively obtained in accordance with the OCR recognition programs with each other.

2. The ledger recognition system according to claim 1, wherein plural types of ledger layouts are preliminarily registered in the headquarter server, and the headquarter server is configured to specify a ledger layout based on image data of the ledger among the plural types of ledger layouts, to extract the handwritten characters written by the user from a fill-out column of the specified ledger layout in which first user information, second user information and amount-of-money information of the specified ledger layout is filled out, and to recognize the handwritten characters written by the user in accordance with the OCR recognition programs.

* * * * *